United States Patent [19]
Pihl

[11] Patent Number: 6,162,407
[45] Date of Patent: Dec. 19, 2000

[54] CHEMICAL DISPENSER AND METHOD OF DISPENSING CHEMICAL

[76] Inventor: Mart A. Pihl, 53 Laureleaf Road, Thornhill, Canada, L3T 2X9

[21] Appl. No.: 09/315,165

[22] Filed: May 20, 1999

Related U.S. Application Data

[60] Provisional application No. 60/086,611, May 22, 1998.

[51] Int. Cl.$^7$ .................................................. E04H 3/20
[52] U.S. Cl. ...................... 422/266; 422/274; 422/275; 422/276; 210/169
[58] Field of Search .................................. 422/266, 274, 422/275, 276, 277; 210/169

[56] References Cited

U.S. PATENT DOCUMENTS

| | | | |
|---|---|---|---|
| D. 170,472 | 9/1953 | Monsarrat | D91/1 |
| D. 188,688 | 8/1960 | Sicard | D46/1 |
| D. 253,007 | 9/1979 | Casberg et al. | D23/3 |
| D. 400,643 | 11/1998 | Watson, Sr. | D23/208 |
| 3,426,901 | 2/1969 | Sherper | 210/169 |
| 3,607,103 | 9/1971 | Kiefer | 23/267 A |
| 4,419,233 | 12/1983 | Baker | 210/169 |
| 4,702,270 | 10/1987 | King, Sr. | 137/268 |
| 5,384,102 | 1/1995 | Ferguson et al. | 422/264 |
| 5,407,567 | 4/1995 | Newhard | 210/198.1 |
| 5,427,748 | 6/1995 | Wiedrich et al. | 210/169 |
| 5,580,448 | 12/1996 | Brandreth, III | 210/206 |
| 5,662,795 | 9/1997 | Pickens et al. | 210/109 |
| 5,932,093 | 8/1999 | Chulick | 210/169 |

*Primary Examiner*—Chester T. Barry
*Attorney, Agent, or Firm*—Hodgson, Russ, Andrews, Woods & Goodyear LLP

[57] ABSTRACT

A chemical dispenser for dispensing chemicals into a tank holding liquid, such as a swimming pool. The chemical dispenser has a housing, a lid, an inlet and an outlet. The lid is selectively attachable to the housing to permit a sanitizing chemical to be placed in the housing.

In a method according to the present invention, a chemical dispenser having a housing, a lid selectively attachable to the housing, an inlet orifice and outlet orifice is provided, and the inlet orifice is positioned to receive circulated liquid from the circulating system outlet. Next, chemical to be dispensed into the circulated liquid is provided and placed in the housing. Then the lid is attached to the housing, and the outlet orifice is positioned such that the flow of liquid from the outlet orifice establishes a flow pattern in the tank which causes debris to travel to and be collected at a debris collection site of the tank.

17 Claims, 8 Drawing Sheets

CHEMICAL DISPENSER AND METHOD OF DISPENSING CHEMICAL

CROSS-REFERENCE TO RELATED APPLICATION

This application claims priority to an earlier filed U.S. provisional patent application, U.S. provisional patent application Ser. No. 60/086,611, which was filed on May 22, 1998, and is incorporated herein by reference.

BACKGROUND OF THE INVENTION

1. Field of the Invention

The present invention relates generally to devices and methods for dispensing chemicals into a tank holding liquid. More specifically, the present invention relates to a device and a method for dispensing chemicals, such as sanitizing chemicals, into swimming pool water.

2. Discussion of Related Art

In the prior art, there are devices for dispensing chemicals into liquid. One such device disclosed in U.S. Pat. No. 5,580,448 has a base member and housing connected into a fluid flow line of a circulating system. Liquid flows from an inlet conduit, into the base member, into the housing, through a filter and a chemical dispensing means, and back out through the base member to an outlet conduit. The chemical dispenser has an upper conduit member, an apertured midsection and a chemical containing lower cartridge. As liquid flows through the chemical dispenser, the chemical dissolves into the liquid.

Another prior art device disclosed in U.S. Pat. No. 5,662,795 is a container having a closed bottom, a lid with a dispensing opening, and a plate with colored markings that is larger than the dispensing opening and freely moveable vertically resting on the bottom of the container. The plate has a specific gravity less than 1.0. In operation, the container is filled with solid sanitizing chemical and placed in a skimmer basket associated with a pool. As the sanitizing chemical dissolves into the liquid, the plate rises toward the top of the container.

Such prior art devices have disadvantages. For example, they have many parts, some of which are not standard hardware, which makes the prior art devices expensive to manufacture. Some of those parts are designed to move during operation, and as movable parts, they may become stuck, break, or deteriorate thereby reducing the effectiveness of the device. In addition, such prior art devices dispense a stream of liquid having a high concentration of chemical, which can be corrosive to the circulating system.

SUMMARY OF THE INVENTION

Accordingly, it is an object of the present invention to provide a device which has fewer parts, and is therefore less expensive to manufacture.

Another object of the present invention is to provide a device which does not have parts which move while chemical is dispensed.

Finally, it is also an object of the present invention to provide a device and method which provides chemical to a tank filled with liquid without exposing the circulating system to a high concentration of chemical.

The foregoing objectives are realized by the device and method of the present invention. A device according to the present invention includes a chemical dispenser for introducing a chemical into a tank holding liquid, such as a swimming pool. The tank is connected to a liquid circulating system, which includes an inlet for accepting the liquid from the tank and an outlet for delivering liquid to the tank. The chemical dispenser has a housing, a lid having a means for selectively attaching the lid to the housing, an inlet orifice for accepting liquid to be delivered to the tank, and a means for positioning the inlet orifice to receive liquid from the circulating system outlet. An outlet orifice is provided in the housing, or alternatively, in the lid. The outlet orifice may be a nozzle for controlling the flow of liquid from the dispenser. The means for positioning the housing may be an integral portion of the housing, or alternatively, may be a coupling having a fluid transmission orifice through which liquid is passed from the circulating system outlet to the housing inlet orifice. The housing is preferably located within the tank and submersed in the liquid.

In a method according to the present invention, a chemical dispenser having a housing, a lid selectively attachable to the housing, an inlet orifice and outlet orifice is provided. The inlet orifice is positioned to receive circulated liquid from a circulating system outlet. Then chemical to be dispensed into the tank is provided and placed in the housing. Next, the lid is attached to the housing, and the outlet orifice is positioned such that the flow of liquid from the outlet orifice establishes a flow pattern in the tank which causes debris in the tank to travel to and be collected at a debris collection site.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which.

BEST MODE FOR CARRYING OUT THE INVENTION

Figure 1:
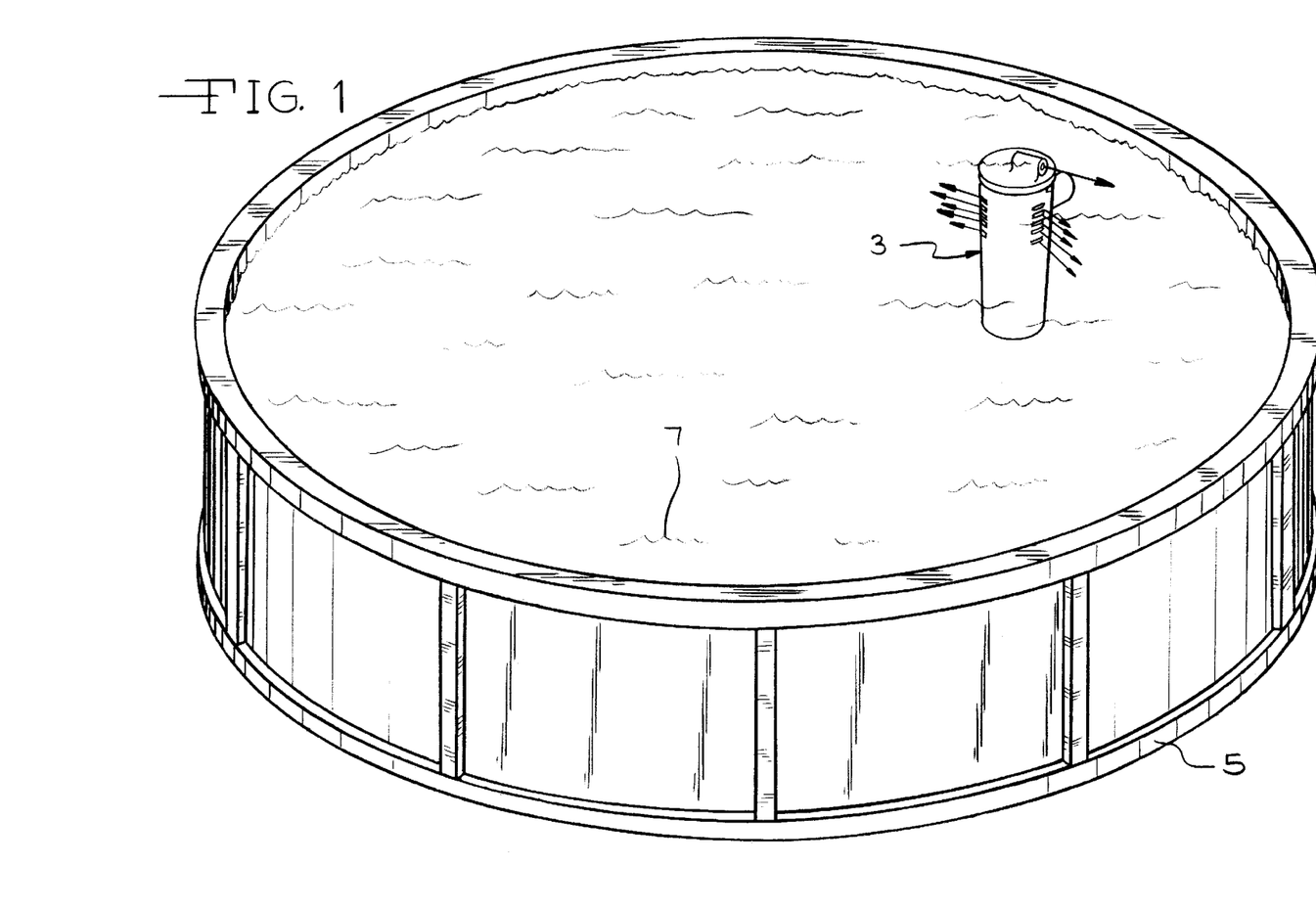
FIG. 1 is a perspective view of a tank with liquid and a device according to the present invention therein.
Figure 2:
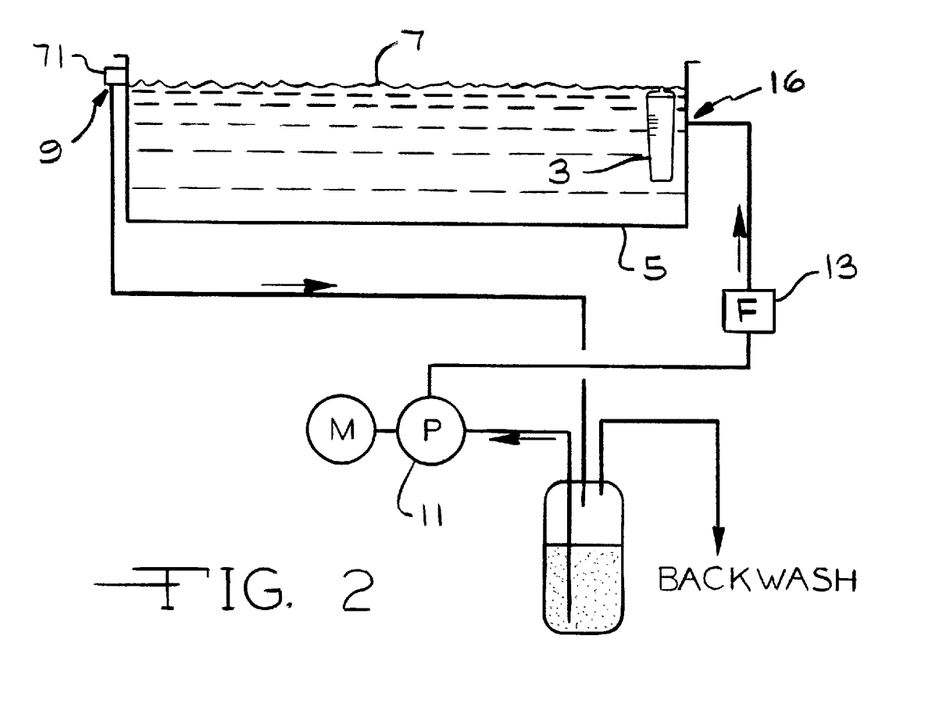
FIG. 2 is a schematic of the tank, a liquid circulating system, and a device according to the present invention.
Figure 3:
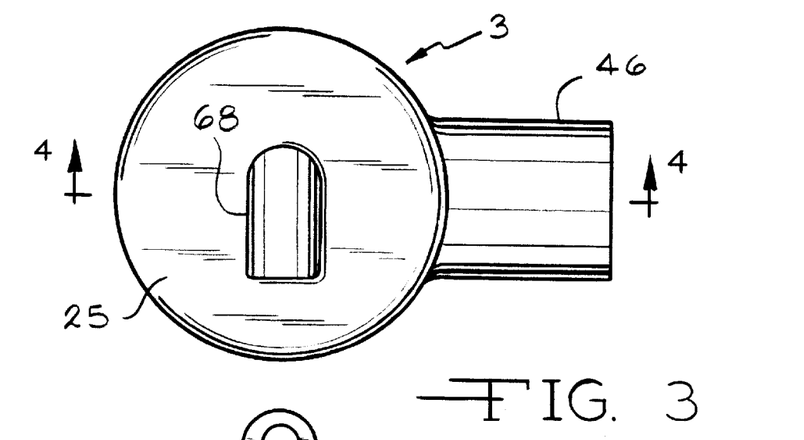
FIGS. 3 and 4 are a top view and a side view respectively of a device according to the present invention.

FIG. 1 shows an embodiment of the chemical dispenser 3 of the present invention installed within a tank 5 holding liquid 7. As shown in FIG. 2, the tank 5 is connected to a circulating system, which has a circulating system inlet 9, pump 11, filter 13 and circulating system outlet 16.

As shown in FIGS. 3–6, the device 3 has a housing 19 for containing a chemical 22 to be introduced into the liquid 7 in the tank 5, and also has a lid 25 having a means for selectively attaching 28 the lid 25 to the housing 19 for permitting periodic filling of the housing 19 with the chemical 22. The means for selectively attaching 28 the lid 25 to the housing 19 may include one or more protrusions 31 for fitting into a corresponding set of indentations 34 in the housing 19. In an alternative embodiment (not shown), protrusions may be provided on the housing 19 for fitting into corresponding indentations in the lid 25. Other methods of selectively attaching the lid 25 to the housing 19 can be used as the means for selectively attaching 28, including a threaded connection (as shown in FIG. 7) or a circumferential tongue and groove (not shown).

The housing 19 and lid 25 are preferably made from a shatter proof material which will withstand attack by the chemical 22 and liquid 7 in the tank 5. In a preferred embodiment of the present invention, the housing 19 is made at least in part from a non-opaque material, such as polycarbonate or polystyrene, for permitting determination of a quantity of chemical 22 within the housing 19 by viewing the level of chemical 22 through the non-opaque material.

Figure 4:
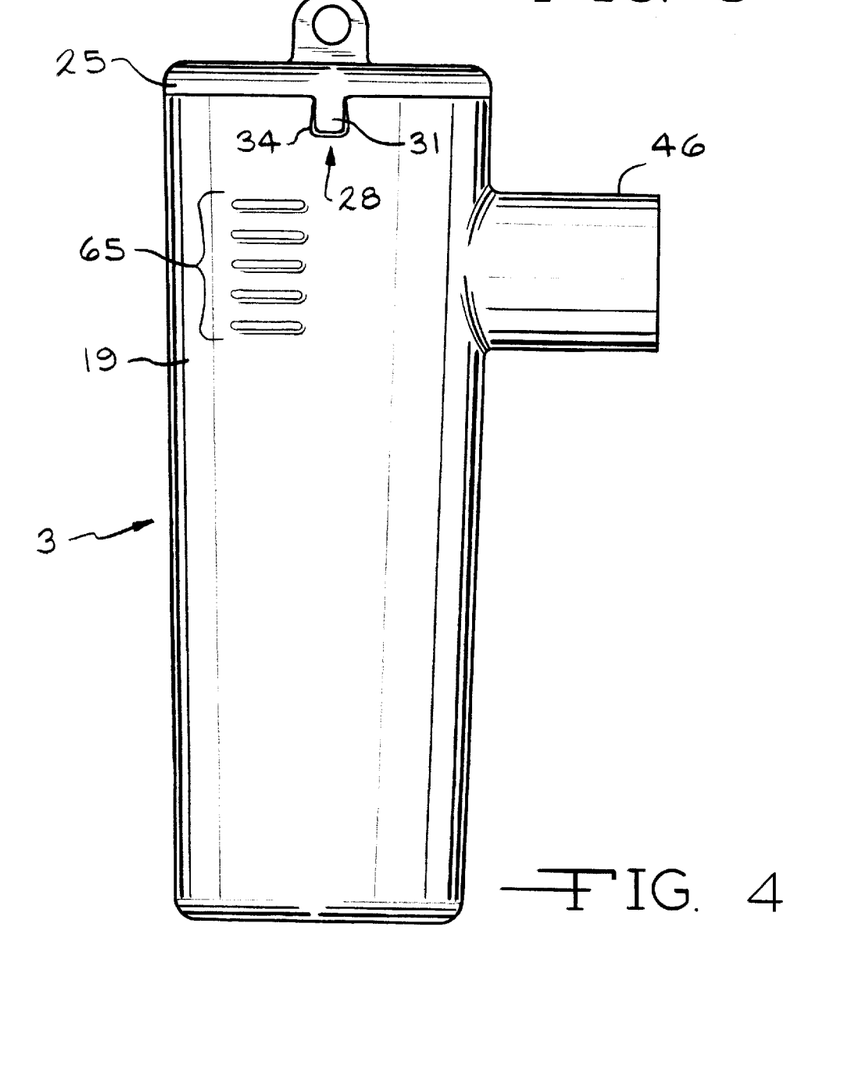
Figure 5:
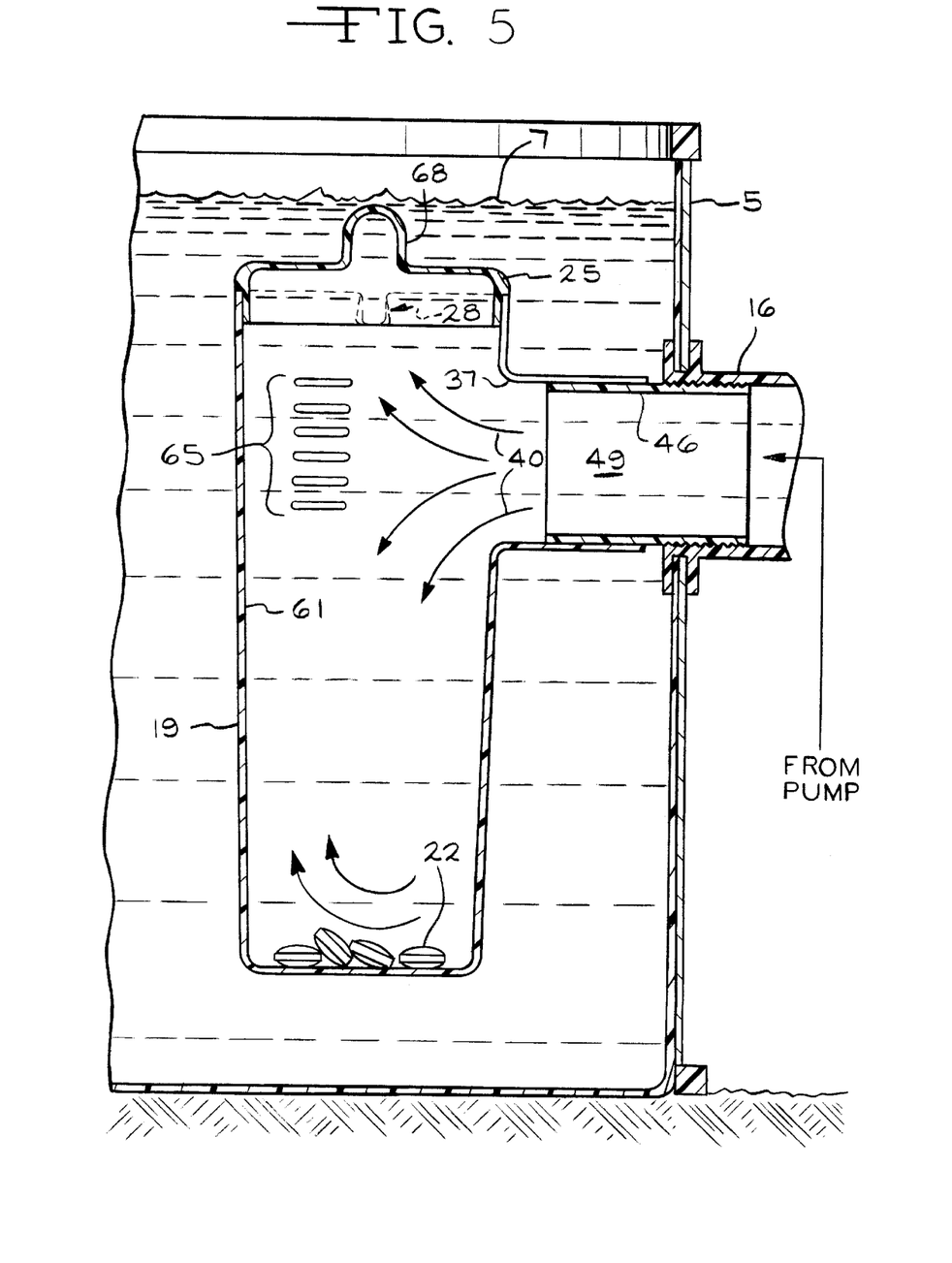
FIG. 5 is a cross-sectional side view of a device according to the present invention installed in a tank.

The housing 19 has an inlet orifice 37 (see FIG. 5) to accept circulated liquid (represented by arrows 40) from the circulating system outlet 16. To properly position the chemical dispenser 3, a means for positioning is provided which positions the housing 19 in the liquid 7 in the tank 5 to dispense chemical, and also positions the housing inlet orifice 37 to receive circulated liquid 40 from the circulating system outlet 16. The housing 19 is preferably positioned such that the housing 19 and lid 25 are submersed in the liquid 7 in the tank 5. The means for positioning the housing 19 may be a coupling 46 having a fluid transmission orifice 49 through which circulated liquid 40 from the circulating system outlet 16 is transmitted to the housing inlet orifice 37. The coupling 46 may be an integral portion of the housing 19, as shown in FIG. 4, or as shown in FIGS. 5, 7 and 8, the coupling 46 may be a separate part from the housing 19. When the coupling 46 is a separate part, the coupling 46 has a means for selectively attaching the coupling 46 to the housing 19. As shown in FIGS. 5 and 7, the means for connecting the coupling 46 to the housing 19 may be an interference or frictional fit between the coupling 46 and housing 19. Alternatively, as shown in FIG. 8, the means for selectively attaching the coupling 46 to the housing 19 may be a threaded portion 52, in which case the housing 19 includes a corresponding threaded portion 55.

The coupling 46 also includes a means for connecting the coupling 46 to the circulating system outlet 16, which may be a threaded portion 58 for mating with a corresponding threaded portion 59 of the circulating system outlet 16. Other methods of connecting the coupling 46 to the housing 19 and to the circulating system outlet 16 may be used, including a circumferential tongue and groove connection (not shown).

Figure 6:
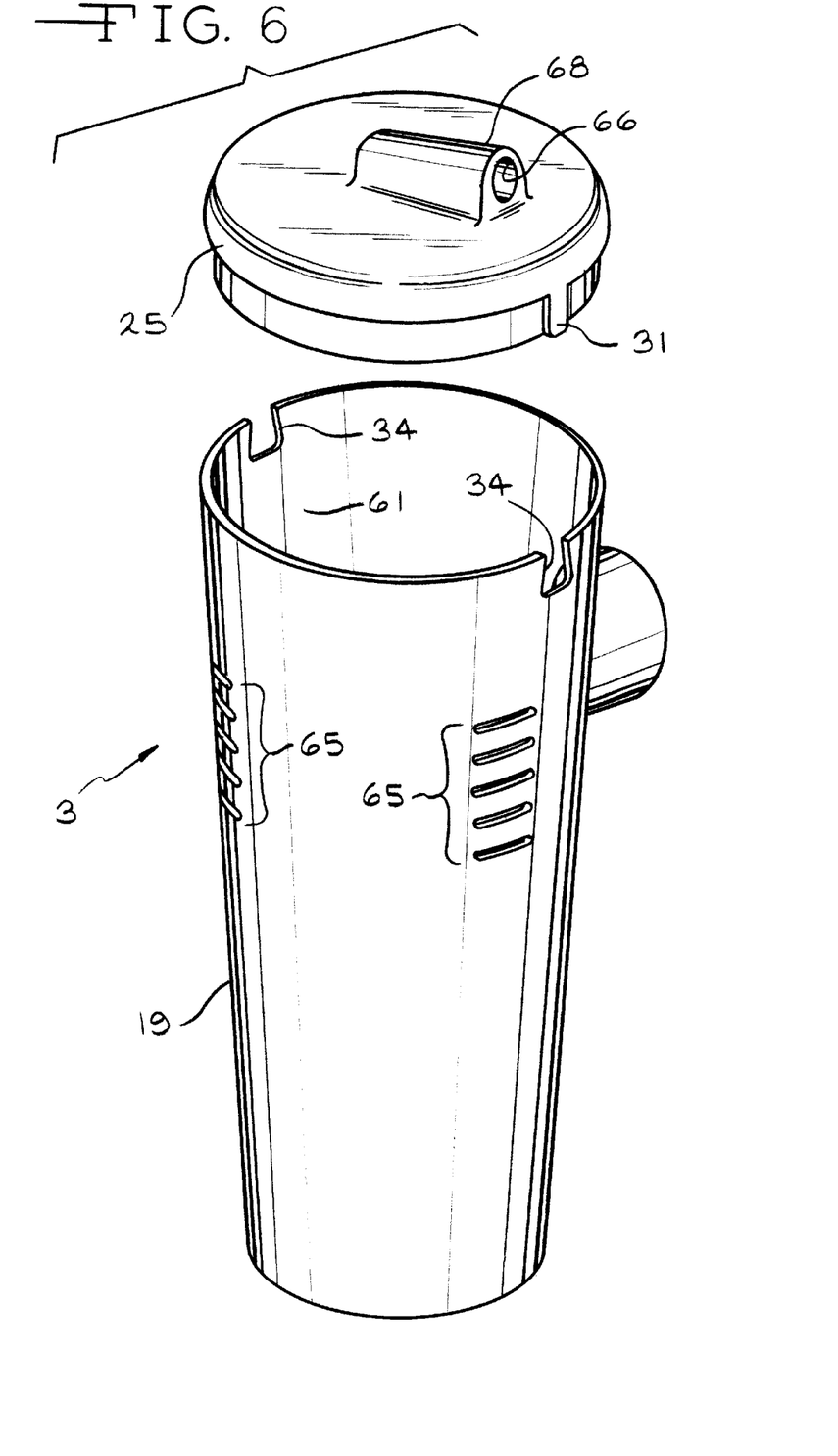
FIG. 6 is a perspective view of a lid and housing of a device according to the present invention.
Figure 7:
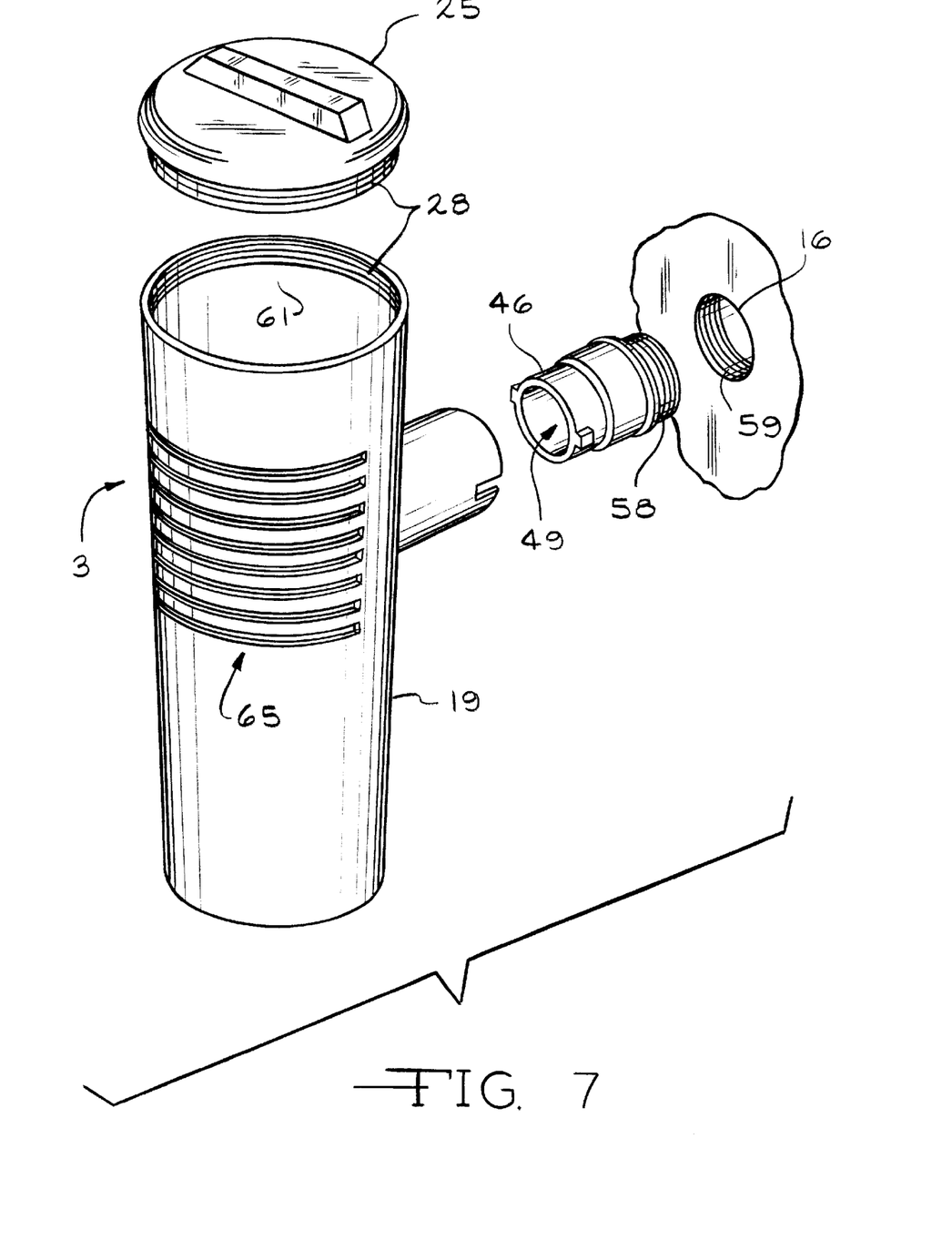
FIG. 7 is an exploded perspective view of an alternative embodiment of the present invention showing a housing, lid and coupling.
Figure 8:
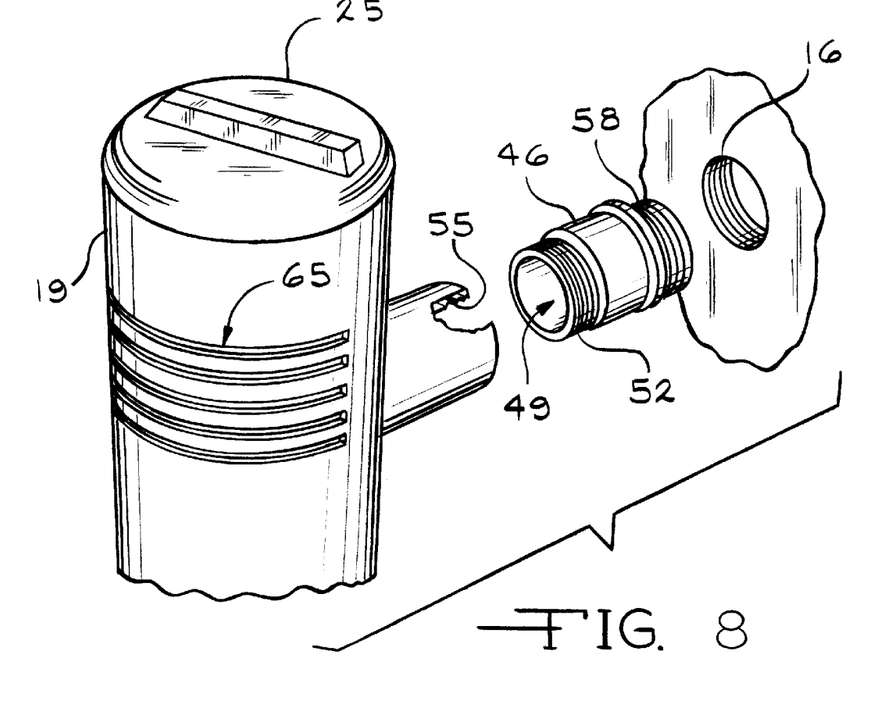
FIG. 8 is an exploded perspective view of an alternative embodiment of the present invention showing the housing with lid attached and a coupling.

As shown in FIGS. 5–7, the housing 19 has an internal surface 61. The internal surface 61 shown in FIGS. 5–7 has a tubular cross section, but the internal surface 61 may be other shapes which provide proper dispensing of the chemical 22. Preferably the internal surface 61 is a closed curve shape to minimize turbulence.

In order to permit circulated liquid 40 to exit the chemical dispenser 3, the housing 19 may have one or more outlet orifices 65. In such an embodiment of the present invention, the outlet orifice 65 may be positioned such that at least some of the circulated liquid 40 is permitted to flow in a generally straight flow path from the inlet orifice 37 to the outlet orifice 65. Such a configuration has been found to minimize pressure loss while providing proper dispensing of the chemical 22. Alternatively, or in addition, the lid 25 may include an outlet orifice 66 as shown in FIG. 6.

Figure 9:
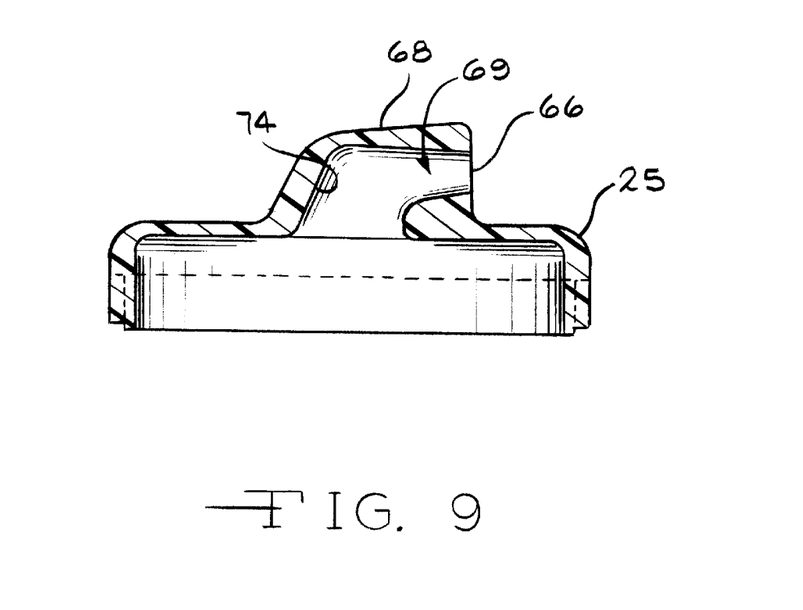
FIG. 9 is a cross sectional side view of a lid having a nozzle with a narrowing aperture therethrough.

Whether an outlet orifice is in the housing 19, the lid 25, or both, the outlet orifice 65,66 may be a hole or slit, or a series of holes and/or slits in the housing 19 and/or lid 25, as the case may be. Alternatively, as shown in FIGS. 4–6, the outlet orifice 65,66 may be associated with a nozzle 68 for controlling the flow of the circulated liquid 40 into the tank 5. As shown in FIG. 9, such a nozzle 68 may include a narrowing aperture 69 for increasing the velocity at which the circulated liquid 40 exits the outlet orifice 66.

Often, a circulating system outlet 16 directs the flow of circulated liquid 40 into the tank 5 to establish a flow pattern in the tank 5 which causes debris in the tank 5 to travel to a debris collection site 71. When the chemical dispenser 3 is connected to the circulating system outlet 16, the flow pattern may be altered and collection of debris may be hindered. Consequently, in an embodiment of the present invention, the outlet orifice 65 in the housing and/or the outlet orifice 66 in the lid 25 may be positioned such that circulated liquid 40 exits the chemical dispenser 3 in a manner which causes debris to travel to and be collected at the debris collection site 71. For example, as shown in FIG. 9, when the lid 25 has a nozzle 68, the nozzle 68 may be provided with a curved surface 74. The curved surface 74 causes circulated liquid 40 to leave the nozzle 68 via outlet orifice 66 in a direction which is desirable for establishing a desired flow pattern in the tank 5. To establish the proper flow pattern in the tank 5, the lid 25 is attached to the housing 19 so that the circulated liquid 40 leaving the chemical dispenser 3 travels in the desired direction.

Figure 10:
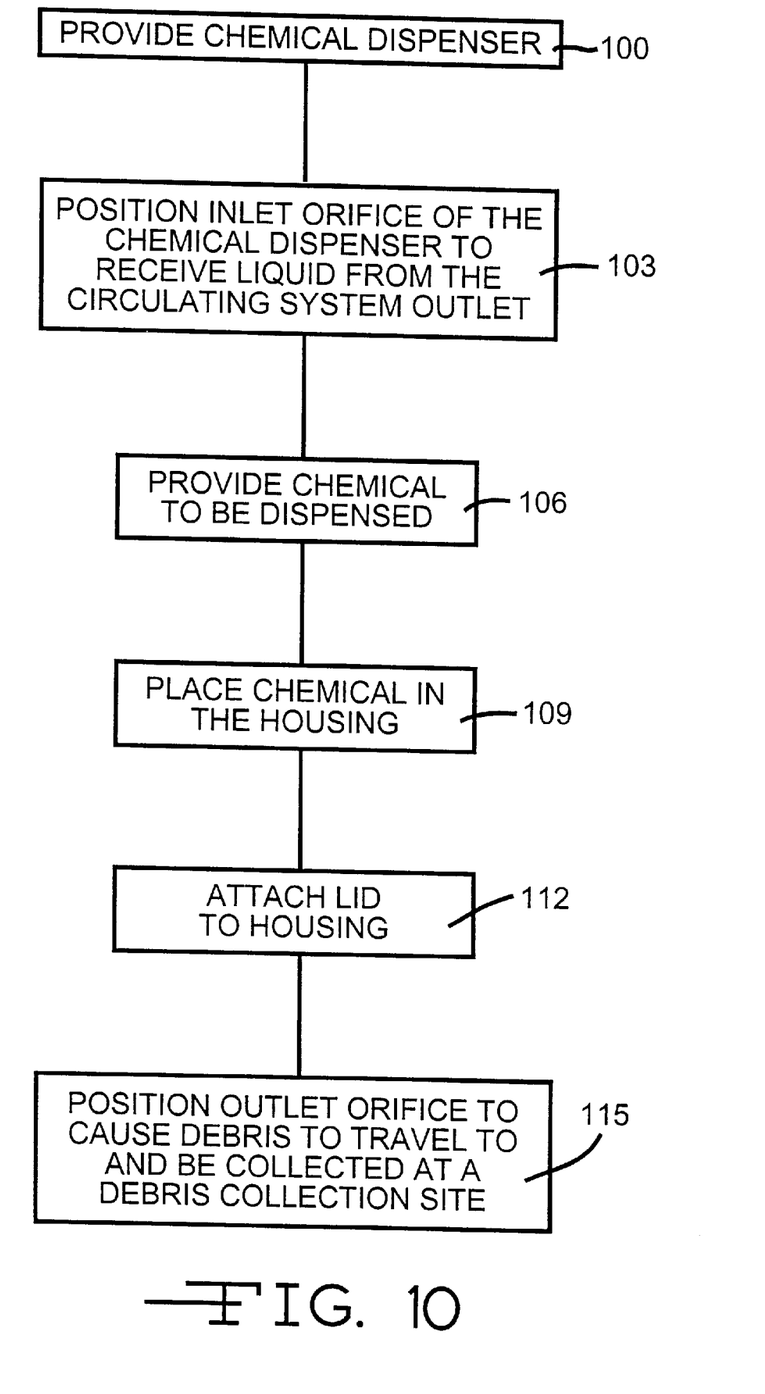
FIG. 10 is a flow chart showing steps of a method according to the present invention.

FIG. 10 shows steps of a method according to the present invention. In that method, a chemical dispenser having a housing, a selectively attachable lid, an inlet orifice and outlet orifice is provided (step 100), and the inlet orifice is positioned (step 103) to receive circulated liquid from the circulating system outlet. Next, chemical to be dispensed, which is dissolvable in the liquid, is provided (step 106) and placed (step 109) in the housing. Then the lid is attached (step 112) to the housing, and the outlet orifice is positioned (step 115) such that the flow of liquid from the outlet orifice establishes a flow pattern in the tank which causes debris to travel to and be collected at a debris collection site of the tank. Using the chemical dispenser 3 described above as an example, as liquid 7 is pumped with pump 11 from the circulating system outlet 16 through the inlet orifice 37 of the chemical dispenser 3, the chemical 22 in the chemical dispenser 3 dissolves into the circulated liquid 40, and the circulated liquid 40 in the chemical dispenser 3 exits through the outlet orifice 65,66 of the chemical dispenser 3, thereby simultaneously introducing chemical 22 into the tank 5 and aiding in collecting debris in the tank 5 at the debris collection site 71.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:

1. A chemical dispenser for introducing a chemical into a tank holding liquid, the tank being connected to a liquid circulating system including an inlet for accepting the liquid from the tank and an outlet for delivering circulated liquid to the tank, the dispenser comprising:

a housing having an inlet orifice for accepting circulated liquid from the circulating system outlet, and for containing the chemical to be introduced into the liquid;

a lid having a means for selectively attaching the lid to the housing to permit periodic filling of the housing with the chemical;

a means for positioning the housing in the liquid in the tank so that the housing inlet orifice receives liquid from the circulating system outlet, wherein the housing and lid are submersed in the liquid.

2. The dispenser of claim 1, wherein the housing has an outlet orifice therein.

3. The dispenser of claim 2, wherein the inlet orifice in the housing is positioned with respect to the outlet orifice in the housing such that at least some of the liquid is permitted to pass from the inlet orifice to the outlet orifice along a generally straight flow path.

4. The dispenser of claim 1, wherein the means for positioning the housing is an integral portion of the housing.

5. The dispenser of claim 1, wherein the means for positioning the housing includes a threaded connection.

6. The dispenser of claim 1, wherein the means for positioning the housing is a coupling having a fluid transmission orifice therethrough, and having a housing attachment means for selectively attaching the coupling to the housing.

7. The dispenser of claim 6, wherein the housing attachment means of the coupling includes a threaded portion and the housing includes a corresponding threaded portion.

8. The dispenser of claim 6, wherein the coupling further includes a threaded connecting portion for attaching to the circulating system outlet.

9. The dispenser of claim 1, wherein the housing includes a non-opaque material for permitting determination of a quantity of chemical within the housing.

10. The dispenser of claim 1, wherein the means for selectively attaching the lid to the housing includes a threaded portion and the housing includes a corresponding threaded portion.

11. The dispenser of claim 1, wherein the means for selectively attaching the lid to the housing includes a protrusion or an indentation, and the housing includes a corresponding indentation or protrusion for connecting to the lid.

12. The dispenser of claim 1, wherein the housing has a tubular cross section.

13. The dispenser of claim 1, wherein the housing has an internal surface which is a closed curve.

14. A chemical dispenser for introducing a chemical into a tank holding liquid, the tank being connected to a liquid circulating system including an inlet for accepting the liquid from the tank and an outlet for delivering circulated liquid to the tank, the dispenser comprising:

a housing having an inlet orifice for accepting circulated liquid from the circulating system outlet, and for containing the chemical to be introduced into the liquid;

a lid having an outlet orifice and a means for selectively attaching the lid to the housing to permit periodic filling of the housing with the chemical;

a means for positioning the housing in the liquid in the tank so that the housing inlet orifice receives liquid from the circulating system outlet.

15. The dispenser of claim 14, wherein the outlet orifice is a nozzle.

16. The dispenser of claim 15, wherein the nozzle includes a narrowing aperture therethrough.

17. A method of dispensing chemical into a tank comprising:

providing a chemical dispenser having a housing, a lid selectively attachable to the housing, an inlet orifice and an outlet orifice;

positioning the inlet orifice of the chemical dispenser to receive circulated liquid from a liquid circulating system outlet;

providing a chemical to be dispensed into circulated liquid, the chemical being dissolvable in the liquid upon contact with the liquid;

placing the chemical in the housing;

attaching the lid to the housing;

positioning the outlet orifice of the chemical dispenser such that debris in the tank is caused to move toward a debris collection location;

dissolving the chemical into the circulated liquid by pumping circulated liquid into the chemical dispenser through the inlet orifice and out of the chemical dispenser through the outlet orifice into the tank toward a debris collection site.

* * * * *